United States Patent
Metaxas

(10) Patent No.: US 6,307,978 B1
(45) Date of Patent: Oct. 23, 2001

(54) SYSTEM AND METHOD FOR PARALLEL ERROR DIFFUSION DITHERING

(75) Inventor: Panagiotis Takis Metaxas, Wellesley, MA (US)

(73) Assignee: Wellesley College, Wellesley, MA (US)

( * ) Notice: Subject to any disclaimer, the term of this patent is extended or adjusted under 35 U.S.C. 154(b) by 0 days.

(21) Appl. No.: 09/090,106

(22) Filed: Jun. 3, 1998

(51) Int. Cl.$^7$ .................................................. G06K 9/36
(52) U.S. Cl. .......................................... 382/252; 382/234
(58) Field of Search .................................. 382/232, 233, 382/234, 235, 236, 239, 240, 248, 249, 250, 251, 252, 253, 302–304, 205; 395/109

(56) References Cited

U.S. PATENT DOCUMENTS

| | | |
|---|---|---|
| 5,271,070 | 12/1993 | Truong et al. . |
| 5,309,525 | 5/1994 | Shimomura et al. . |
| 5,373,455 * | 12/1994 | Edgar ..................... 364/514 |
| 5,519,791 | 5/1996 | Webb et al. . |
| 5,528,384 | 6/1996 | Metcalfe et al. . |
| 5,553,165 * | 9/1996 | Webb et al. ............ 382/252 |
| 5,592,592 * | 1/1997 | Shu ....................... 395/109 |
| 5,604,605 | 2/1997 | Moolenaar . |
| 5,627,659 | 5/1997 | Kakutani . |
| 5,663,810 | 9/1997 | Kirk . |
| 5,682,442 * | 10/1997 | Johnston et al. ....... 382/239 |
| 5,818,971 * | 10/1998 | Moolenaar et al. .... 382/252 |
| 5,870,503 * | 2/1999 | Kumashiro .............. 382/252 |
| 5,974,228 * | 10/1999 | Heitsch ................... 395/109 |

OTHER PUBLICATIONS

Yuefeng Zhang, "Line Diffusion: a parallel error diffusion algorithm for digital halftoning", Springer Link: The Visual Computer, vol. 12 Issue 1, pp. 40–46 (Abstract only).

Donald E. Knuth, "Digital halftones by dot diffusion", Oct., 1987, ACM, Inc. vol. 6, No. 4, pp. 245–273.

* cited by examiner

Primary Examiner—Phuoc Tran
Assistant Examiner—Amir Alavi
(74) Attorney, Agent, or Firm—Samuels, Gauthier & Stevens

(57) ABSTRACT

A system is disclosed for error diffusion dithering. The system includes an input for receiving an input matrix representative of image data, and a plurality of processors. The plurality of processors processes the input matrix and provides output data. Each of the processors is in communication with at least a portion of the input matrix. At least one processor processes a portion of the input matrix defined at least in part by a substantially diagonal edge within the image matrix.

29 Claims, 6 Drawing Sheets

SYSTEM AND METHOD FOR PARALLEL ERROR DIFFUSION DITHERING

BACKGROUND OF THE INVENTION

The present invention relates to the display of image data as a collection of picture elements (or pixels), and particularly relates to the display of color image data as a collection of picture elements wherein the variety of colors of the image data is greater than the variety of colors available for each picture element.

For example, color images may be displayed on black and white CRT displays (or flat panel displays or printers), but some information will be lost. Typically, for black and white displays, the value (or grayscale value) of each pixel of the image is compared to a threshold value, and if it is above the threshold then the pixel appears black, and if it is below the threshold then the pixel appears white. The difference between the greyscale value of an image pixel and the threshold is known as a pixel's error.

Dithering, or halftoning, refers to a variety of techniques that have been developed to distribute each pixel's error among neighboring pixels. For example, the Floyd and Steinberg method processes the input image in a linear fashion, scanning pixels from left to right and from top to bottom. See Robert W. Floyd and Louis Steinberg, *An Adaptive Algorithm for Spatial Grayscale*, Proceedings of the Society for Information Display, v.17, pp. 75–77 (1976). At each step of the Floyd and Steinberg method, the grayscale value of the current pixel (which is represented as an integer between 0 and 255), is compared to some threshold value, typically 128. Grayscale values above 128 are displayed as black, and grayscale values of 128 and below are displayed as white. The error for each pixel is distributed to four neighboring pixels that have not yet been processed. Specifically, and with reference to FIG. 1 of the drawings, the error for a pixel in row "r" and column "c" ($P_{r,c}$) is distributed to pixels $P_{r,c+1}$, $P_{r+1,c+1}$, $P_{r+1,c}$, and $P_{r+1,c-1}$. The pixel error is distributed with weights of $7/16$ for $P_{r,c+1}$, $1/16$ for $P_{r+1,c+1}$, $5/16$ for $P_{r+1,c}$, and $3/16$ for $P_{r+1,c-1}$.

The Floyd and Steinberg process is time consuming, and typically requires five floating-point multiplications and five memory accesses to process each pixel of the image. For an image with dimensions "n" by "m" this typically takes 10×n×m operations. The method is also, therefore, computationally expensive.

More elaborate dithering methods have further been proposed in which each pixel's error is distributed to up to 12 neighboring unprocessed pixels in accordance with various weight distributions. These algorithms produce displays of improved image quality over the Floyd and Steinberg method, but are more computationally expensive, requiring 24×n×m floating point multiplications and memory accesses for each n by m image. See J. F. Jarvis, C. N. Judice and W. H. Kinke, *A Survey of Techniques for the Display of Continuous Tome Pictures on Bi-Level Displays*, Computer Graphics and Image Processing, v.5, p.13–40 (1976); and P. Stucki, *MACCA—A Multiple Error Correcting Algorithm For Bi-Level Image Hard Copy Reproduction*, Research Report RZ1060, IBM Research Laboratory, Zurich, Switzerland (1981).

U.S. Pat. No. 5,553,165 discloses a method of parallel error diffusion. In the method of the '165 patent, the image is processed in a conventional top down, line by line left to right order. With reference to FIG. 2 of the drawings, two or more processors (P and Q) are employed to process the image by having each processor scan the image along different rows, slightly offset from one another. Error diffusion data is written to and read from a memory unit that is shared between the processors. The method of the '165 patent, however, is still rather time consuming because the memory unit must be continuously accessed by both processors, and because each pixel must be accessed twice. Using additional processors in the method of the '165 patent in turn requires more interaction between the processors and sharing of data via common memory.

Dithering requires that a pixel be processed only after all of the pixels from which it depends have been processed. The use of multiple processors, therefore, has been of only marginal benefit because some processors will be required to wait for others. Moreover, the processors in a multiprocessor system must share memory, and each pixel may be required to be accessed at least twice. Further, the number of processors may not be easily changed in a parallel dithering system such as that of the '165 patent without reconfiguring the physical system. There is a need, therefore, for a more efficient method of dithering.

SUMMARY OF THE INVENTION

The system includes an input for receiving an input matrix representative of image data, and a plurality of processors. The plurality of processors processes the input matrix, and each of the processors is in communication with at least a portion of the input matrix. At least one processor processes a portion of the input matrix defined at least in part by a substantially diagonal edge within the image matrix. An output may also be provided in communication with each of the processors, and the output provides an output matrix representative of dithered image data.

In various embodiments of the invention, the input matrix is divided into diagonal input areas having a row width of at least three picture elements. Each processor in a linear array of processors processes a diagonal input area. In other embodiments, a matrix of processors may be used to process the input matrix, and the input matrix may be preprocessed prior to being divided into input areas.

BRIEF DESCRIPTION OF THE DRAWINGS

The following detailed description of the illustrated embodiments may be further understood with reference to the accompanying drawings in which:

FIG. 8 is a diagrammatic representation of an input matrix to be processed in accordance with an embodiment of the invention employing the array of processors shown in FIG. 7;

FIGS. 9 and 10 are diagrammatic representations of the input matrix shown in FIG. 8 as it is being preprocessed in accordance with an embodiment of the invention;

DETAILED DESCRIPTION OF THE ILLUSTRATED EMBODIMENTS

Figure 1:
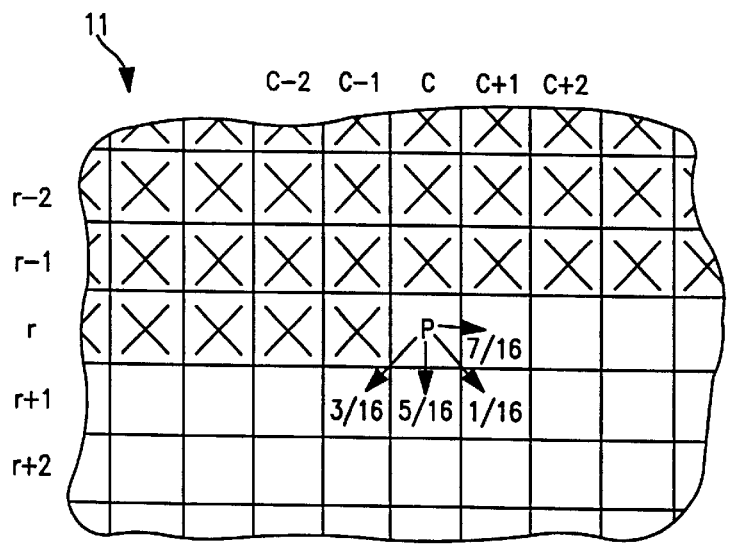
FIG. 1 is a diagrammatic representation of a dithering method of the prior art.
Figure 2:
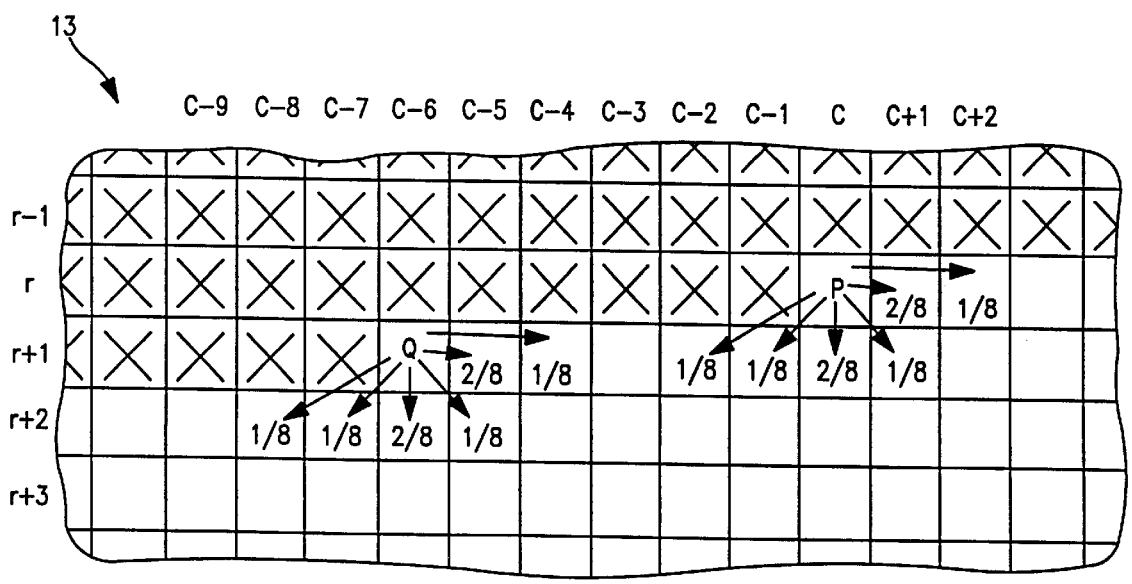
FIG. 2 is a diagrammatic representation of another dithering method of the prior art.

FIG. 1 shows the prior art Floyd and Steinberg method discussed above, where the image matrix 11 is processed sequentially, e.g., left to right and line by line. Processed pixels are shown containing an "X". FIG. 2 shows an exemplary prior art method of the '165 patent where the image matrix 13 is also processed in a line by line fashion, but by using two processors P and Q. Specifically, processor P processes rows r, r−2, r+2 etc., and processor Q processes the alternate rows r−1, r+1, r+3, etc. Note that one processor, Q, must lag behind the other as the two processors comb through two lines at a time of the image data.

Although the traditional line-by-line approach may be suitable for systems employing only one processor, the use of the line-by-line approach with multiple processors has been limited. For example, even if many processors are employed to process different rows (as in the method of the '165 patent), then many of the processors will be required to wait or lag behind, other processors until all dependant pixels have been processed. Also, if the image is separated into areas to be processed independently, then error diffusion at the boundaries of the separate areas will be lost, detracting from the quality of the image.

The invention provides a method of partitioning image data such that multiple processors may be employed more efficiently. In an embodiment of the invention a systolic linear array of N processors is used in such a way that an image can be dithered approximately N times faster than with the sequential error-diffusion dithering techniques. The systolic linear array may comprise either general purpose or special purpose processing equipment.

Each pixel in an image must be scheduled to be processed only after all pixels from which it depends have already been processed. The invention takes advantage of the observation that the dithered value of a pixel (i,j) (using for example, the Floyd and Steinberg method), depends not only on its initial grayscale value, but also on the diffused errors (and therefore the original grayscale values) of a certain set of pixels. This set may be defined as the set of all pixels in row x and column y, or (x,y), such that $$1 \leq x \leq i, \text{ and } 1 \leq y \leq (2j+1)$$

where the upper left-most corner is defined as (1,1).

Figure 3:
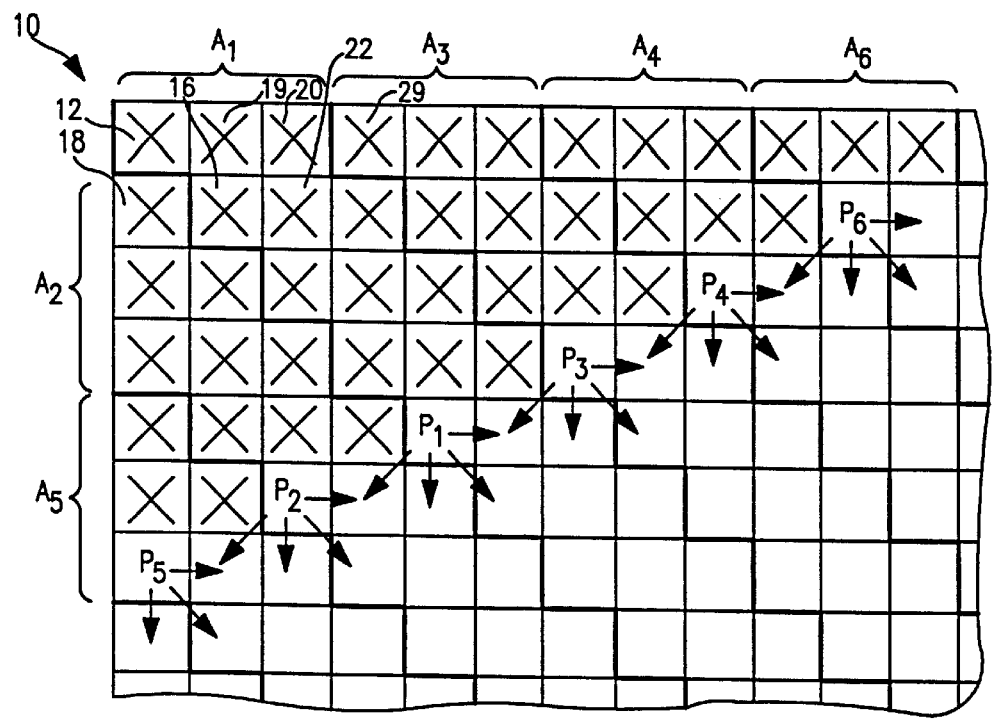
FIG. 3 is a diagrammatic representation of a dithering method of the invention.

It has been discovered that if the image data is a matrix having n rows and m columns, then pixels may be processed along a diagonal front that is less steep that the primary diagonal front $y=(n-x)$. This new diagonal front will generally move from the upper left corner and travel to the bottom right corner, and at any time will extend from the lower left corner toward the upper right corner. For example, as shown in FIG. 3, the diagonal front comprises $P_5-P_2-P_1-P_3-P_4-P_6$.

An exemplary method of the invention is illustrated in FIG. during operation employ the Floyd and Steinberg error proportion distribution method. FIG. 3 shows a portion of an image matrix 10 including a plurality of pixels. The processor $P_1$ processes the pixels in the diagonal area generally indicated at $A_1$ as further shown in FIG. 4. Each of the other processors $P_2$, $P_3$, $P_4$, $P_5$ and $P_6$ process the pixels in each of the diagonal areas $A_2$, $A_3$, $A_4$, $A_5$ and $A_6$ respectively.

The upper left-most pixel 12 is processed first by the processor $P_1$. Its error data is distributed to pixels 14, 16 and 18. The numbers within the pixel boxes in FIG. 4 indicate the order with which the pixels are processed relative to one another. The processor $P_1$ then processes pixel 14 and distributes its error to pixels 20, 22, 16 and 18. When processor $P_1$ begins to processes pixel 20, processor $P_2$ begins processing pixel 18 since all of the pixels on which pixel 18 depends have already been processed. When processor $P_1$ begins to process pixel 16, the processor $P_3$ begins to process pixel 24. In this fashion, each of the processors join in as the image data matrix is processed. Each pixel is processed only after all of the pixels from which it depends have been processed.

A linear array of processors is used in the present embodiment. Each processor is capable of input and output, and can communicate with its left and right neighbors. Suitable hardware may include, for example, a MasPar MP-1101 general purpose parallel computer sold by NeoVista Software of Cupertino, Calif. Other systems may be created by connecting small processors together (e.g., the Intel 286 sold by Intel Corporation of Milpitas, Calif.).

To process an n by m image using N linearly connected processors (and using the neighbor distribution scheme of Floyd and Steinberg), the kth processor is initially determined to be the starting processor, where $k=[(n-1)/d]$, where d is the diagonal width, that is, the width of the diagonal that each processor will dither across the image. The minimum width d depends on the neighbor distribution scheme that will be employed. A neighbor distribution scheme distributes the error to columns ahead of and behind each pixel. The number of columns behind the pixel to which the error is distributed, plus 2 determines the minimum swipe width d. For example, for the Floyd and Steinberg neighbor distribution scheme shown in FIG. 1, error is distributed to one column behind each pixel, so d is therefore equal to 3. For the neighbor distribution scheme shown in FIG. 2, d=4. The number of columns ahead of each pixel, as well as the number of rows below the pixel to which the error is distributed does not affect this calculation.

Figure 5:
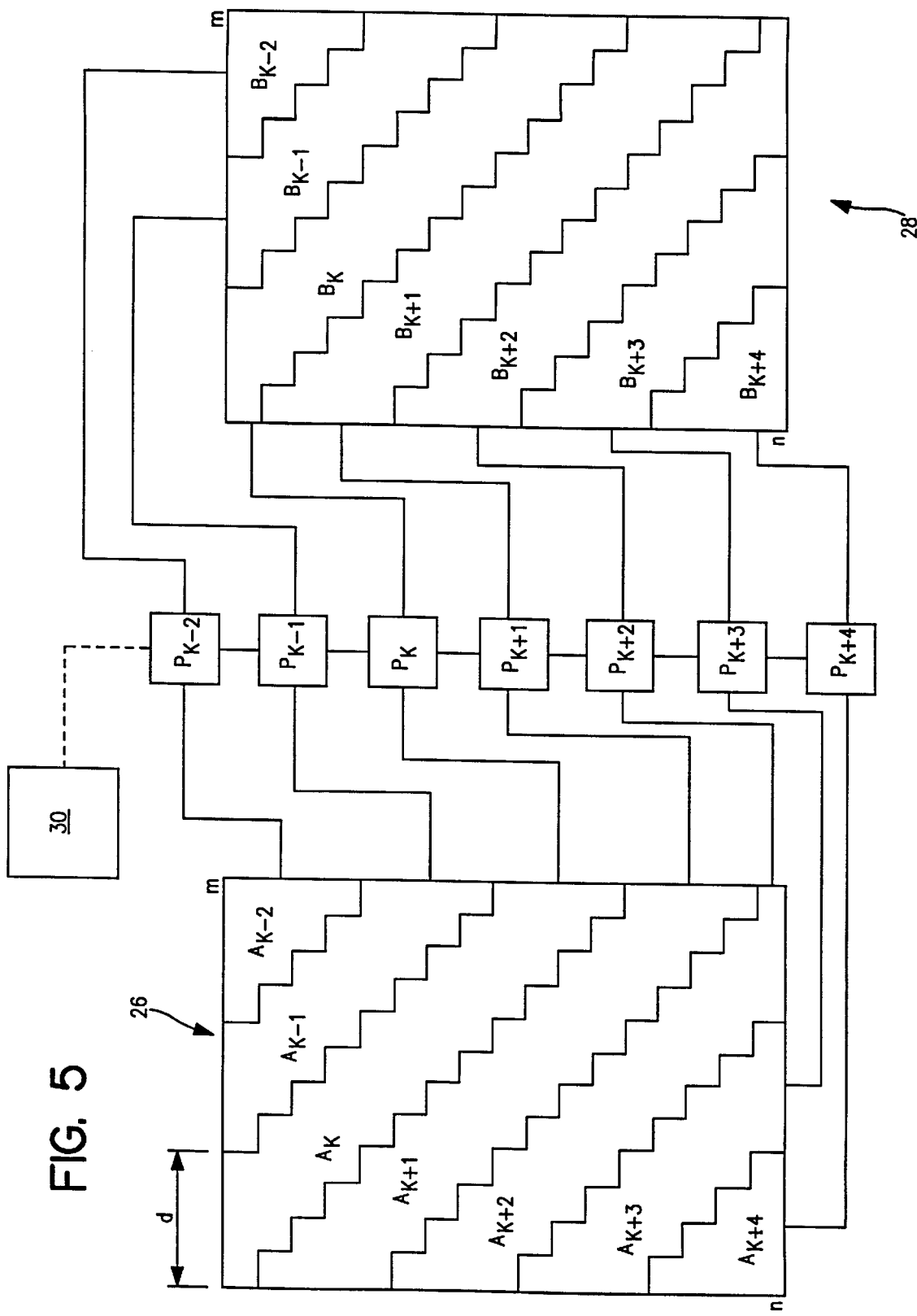
FIG. 5 is a diagrammatic representation of the functional relationship between an input matrix, a linear array of processors, and an output matrix in accordance with an embodiment of the invention.

FIG. 5 shows a functional diagram of a system of the invention. An n by m matrix 26 is divided into a plurality of diagonals of width d. Each diagonal $A_{k-2}-A_{k+4}$ is processed by a different processor $P_{k-2}-P_{k+4}$ respectively, beginning with the processor $P_k$. The output of each processor $P_{k-2}-P_{k+4}$ is connected to a diagonal portion $B_{k-2}-B_{k+4}$ of the n by m output matrix 28. The processors $P_{k-2}-P_{k+4}$ are connected together in a linear array. In certain embodiments, an additional control processor 30 may be employed to direct the operation and timing of the processors $P_{k-2}-P_{k+4}$.

The operation of the method discussed above with reference to FIGS. 3 and 4, will now be discussed in more detail. The processing of three consecutive pixels of an image is called a superstep. The following tables give the coordinates of the pixels accessed by processors to the right and to the left of the starting processor $P_K$. The processing time of any processor that is at distance $\alpha$ away from $P_K$, is described by the process $P_{K+\alpha}$ and $P_{k-\alpha}$ as follows. The following table describes the supersteps of the processors to the right of the starting processor $P_K$.

| Super-step | $P_k$ | $P_{K+1}$ | $P_{k+2}$ | ... | $P_{k+\alpha}$ |
|---|---|---|---|---|---|
| 1 | (1, 1) | | | | |
| | (1, 2) | | | | |
| | (1, 3) | | | | |
| 2 | (2, 2) | (1, 4) | | | |
| | (2, 3) | (1, 5) | | | |
| | (2, 4) | (1, 6) | | | |
| 3 | (3, 3) | (2, 5) | (1, 7) | | |
| | (3, 4) | (2, 6) | (1, 8) | | |
| | (3, 5) | (2, 7) | (1, 9) | | |
| ... | | | | | |
| $\alpha + 1$ | $(\alpha + 1, \alpha + 1)$ | | | | $(1, 3\alpha + 1)$ |
| | $(\alpha + 1, \alpha + 2)$ | | | | $(1, 3\alpha + 2)$ |
| | $(\alpha + 1, \alpha + 3)$ | | | | $(1, 3\alpha + 3)$ |
| $\alpha + 2$ | $(\alpha + 2, \alpha + 2)$ | | | | $(2, 3\alpha + 2)$ |
| | $(\alpha + 2, \alpha + 3)$ | | | | $(2, 3\alpha + 3)$ |
| | $(\alpha + 2, \alpha + 4)$ | | | | $(2, 3\alpha + 4)$ |
| ... | | | | | |
| $\alpha + \tau$ | $(\alpha + \tau, \alpha + \tau)$ | | | | $(\tau, 3\alpha + \tau)$ |
| | $(\alpha + \tau, \alpha + \tau + 1)$ | | | | $(\tau, 3\alpha + (\tau + 1))$ |
| | $(\alpha + \tau, \alpha + \tau + 2)$ | | | | $(\tau, 3\alpha + (\tau + 2))$ |

To implement this, the processor $P_{k+\alpha}$ wakes up at the beginning of superstep $\alpha+1$ and initializes variables x=1 and y=3α+1. In a superstep, processor $P_{K+\alpha}$ processes pixels with coordinates (x,y), (x,y+1), (x,y+2), and then resets x=x+1 and y=y+1 in preparation for the next superstep. Supersteps continue until all of the image to the right of the kth processor has been processed.

Meanwhile, the processors to the left of the kth processor follow supersteps as follows:

| Super-Step | $P_{k-\alpha}$ | ... | $P_{k-2}$ | $P_{k-1}$ | $P_k$ |
|---|---|---|---|---|---|
| 1 | | | | | (1, 1) |
| | | | | | (1, 2) |
| | | | | (2, 1) | (1, 3) |
| 2 | | | | | (2, 2) |
| | | | | (3, 1) | (2, 3) |
| | | | | (3, 2) | (2, 4) |
| 3 | | | | (4, 1) | (3, 3) |
| | | | | (4, 2) | (3, 4) |
| | | | (5, 1) | (4, 3) | (3, 5) |
| ... | | | | | |
| $\alpha + \tau$ | $(2\alpha + \tau, -\alpha + \tau)$* | | | $(\alpha + \tau + 1, \alpha + \tau - 2)$ | $(\alpha + \tau, \alpha + \tau)$ |
| | $(2\alpha + \tau, -\alpha + \tau + 1)$ | | | $(\alpha + \tau + 1, \alpha + \tau - 1)$ | $(\alpha + \tau, \alpha + \tau + 1)$ |
| | $(2\alpha + \tau, -\alpha + \tau + 2)$ | | | $(\alpha + \tau + 1, \alpha + \tau)$ | $(\alpha + \tau, \alpha + \tau + 2)$ |
| ... | | | | | |
| $2\alpha - 1$ | | | | $(2\alpha, 2\alpha - 3)$ | $(2\alpha - 1, 2\alpha - 1)$ |
| | | | | $(2\alpha, 2\alpha - 2)$ | $(2\alpha - 1, 2\alpha)$ |
| | $(3\alpha - 1, 1)$ | | | $(2\alpha, 2\alpha - 1)$ | $(2\alpha - 1, 2\alpha + 1)$ |
| $2\alpha$ | | | | $(2\alpha + 1, 2\alpha - 2)$ | $(2\alpha, 2\alpha)$ |
| | $(3\alpha, 1)$ | | | $(2\alpha + 1, 2\alpha - 1)$ | $(2\alpha, 2\alpha + 1)$ |
| | $(3\alpha, 2)$ | | | $(2\alpha + 1, 2\alpha)$ | $(2\alpha, 2\alpha + 2)$ |
| $2\alpha + 1$ | $(3\alpha + 1, 2)$ | | | | $(2\alpha + 1, 2\alpha + 1)$ |
| | $(3\alpha + 1, 3)$ | | | | $(2\alpha + 1, 2\alpha + 2)$ |
| | $(3\alpha + 1, 4)$ | | | | $(2\alpha + 1, 2\alpha + 3)$ |

*$(\alpha + (\alpha + \tau), -2\alpha + (\alpha + \tau)) = (2\alpha + \tau, -\alpha + \tau)$ Implementation is similar to that discussed above. Processor $P_{k-\alpha}$ wakes up at beginning of superstep 2α−1 and initializes variables x=3α−1 and y=−1. In a superstep, a processor processes pixels (x,y), (x,y+1), (x,y+2), and then resets x=x+1 and y=y+1 in preparation for the next superstep. Supersteps continue until all of the image has been processed. A pixel is not processed if y≦1, or if x≦1. To process a pixel, the dithered value is calculated and the error from dithering is apportioned to the neighboring pixels in accordance with the chosen neighbor distribution scheme.

Figure 6:
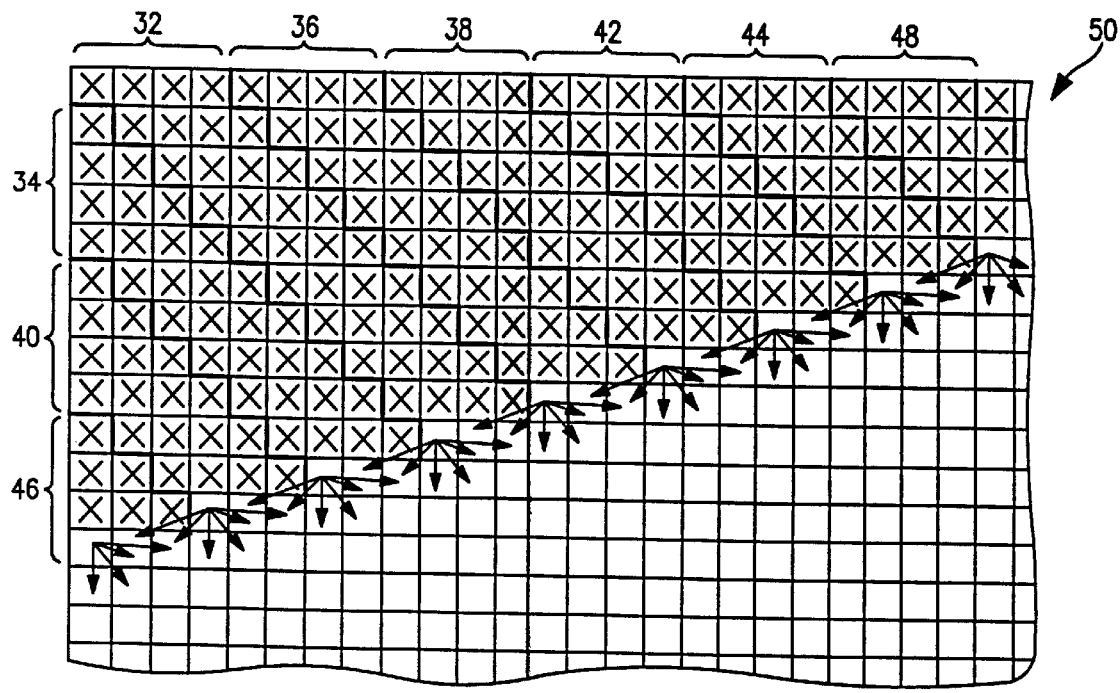
FIG. 6 is a diagrammatic representation of another dithering method of the invention.

FIG. 6 is a diagrammatic representation of another dithering method of the invention that involves the neighbor distribution scheme shown in FIG. 2, for which d=4. For the neighbor distribution scheme shown in FIG. 6 (shown without distribution ratios), d equals 4, since 2 plus the number of columns behind each pixel to which error is distributed equals 4. Again, processed pixels are shown as including an "x", and each processor processes a diagonal of width 4. As shown in FIG. 6, a plurality of processors process diagonal areas 32–48 of the matrix 50.

The minimum width d will always be at least 3. Depending on the communication/computation ratio of the particular linear array used, it may be worth assigning a wider slanted area to each processor to compensate for the difference. For N≧⌈(n+m)/d⌉ each processor evaluates at most 3n pixels, where n is the number of rows in the image. If N<⌈(n+m)/d⌉, then the image is divided in (n+m)/N wider slanted areas. Given a large enough N, the running time of the algorithm is T(n,m)=2n+m which is asymptotically smaller than 10×n×m and 24×n×m as required by conventional techniques.

The efficiency of the system of the invention depends on the squareness of the image, i.e., how close |n−m| is to zero. A skinny image would dither much more slowly than a square image with the same number of pixels. If m is much larger than n, then the image could be transposed prior to processing, since there is no difference in the quality of the final dithered image. The total running time, therefore, is T(n,m)=2 min(n,m)+max(n,m).

Figure 7:
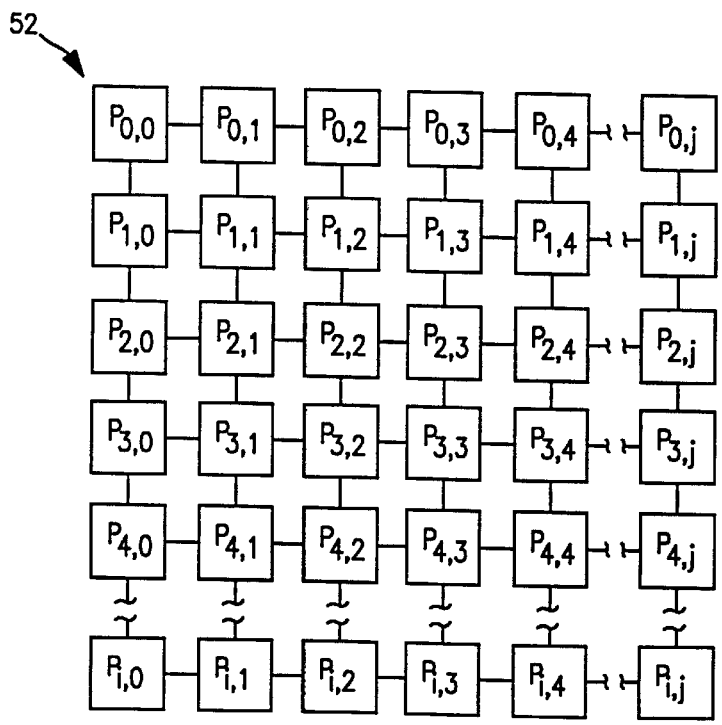
FIG. 7 is a diagrammatic representation of an array of processors that may be employed in accordance with another embodiment of the invention.

In other embodiments of the invention, a two dimensional array of processors 52 as shown in FIG. 7 may be employed in place of the linear array of processors $P_{k-2}$–$P_{k+4}$ shown in FIG. 5. Each of the processors $P_{0,0}$–$P_{i,j}$ in the array 52 should be connected to the input matrix as well as the output matrix. Since communication between processors is generally faster than communication between shared memory and a processor, the use of an array of processors provides a faster dithering method.

A two dimensional array of processors typically provide programming primitives that allow the array to activate lines or rows of processors at a time. To simplify communication between neighboring processors, the image may be read into the processor array in a fashion that takes advantage of such primitives. For example, a 7 row by 9 column input image matrix 54 as shown in FIG. 8 may be read into a 7 row by 5 column processor array as shown in FIG. 10 as follows.

Figure 4:
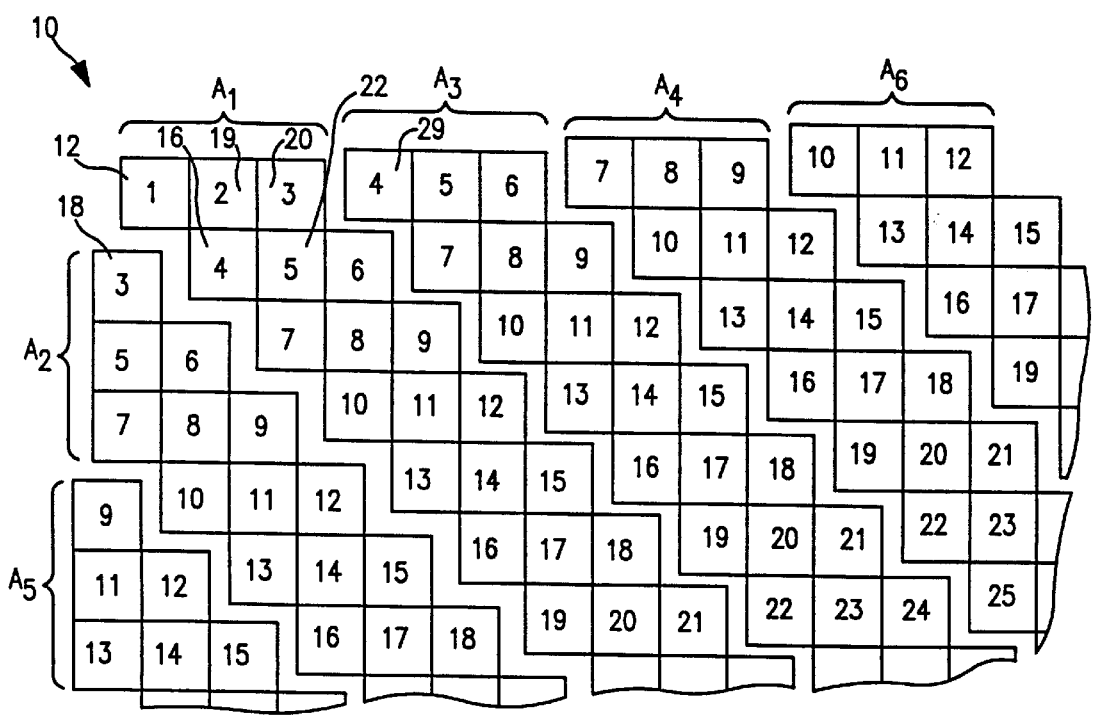
FIG. 4 is a diagrammatic representation of the dithering method of FIG. 3, showing the time at which each pixel is processed relative the other pixels.
Figures 8, 9, 10:
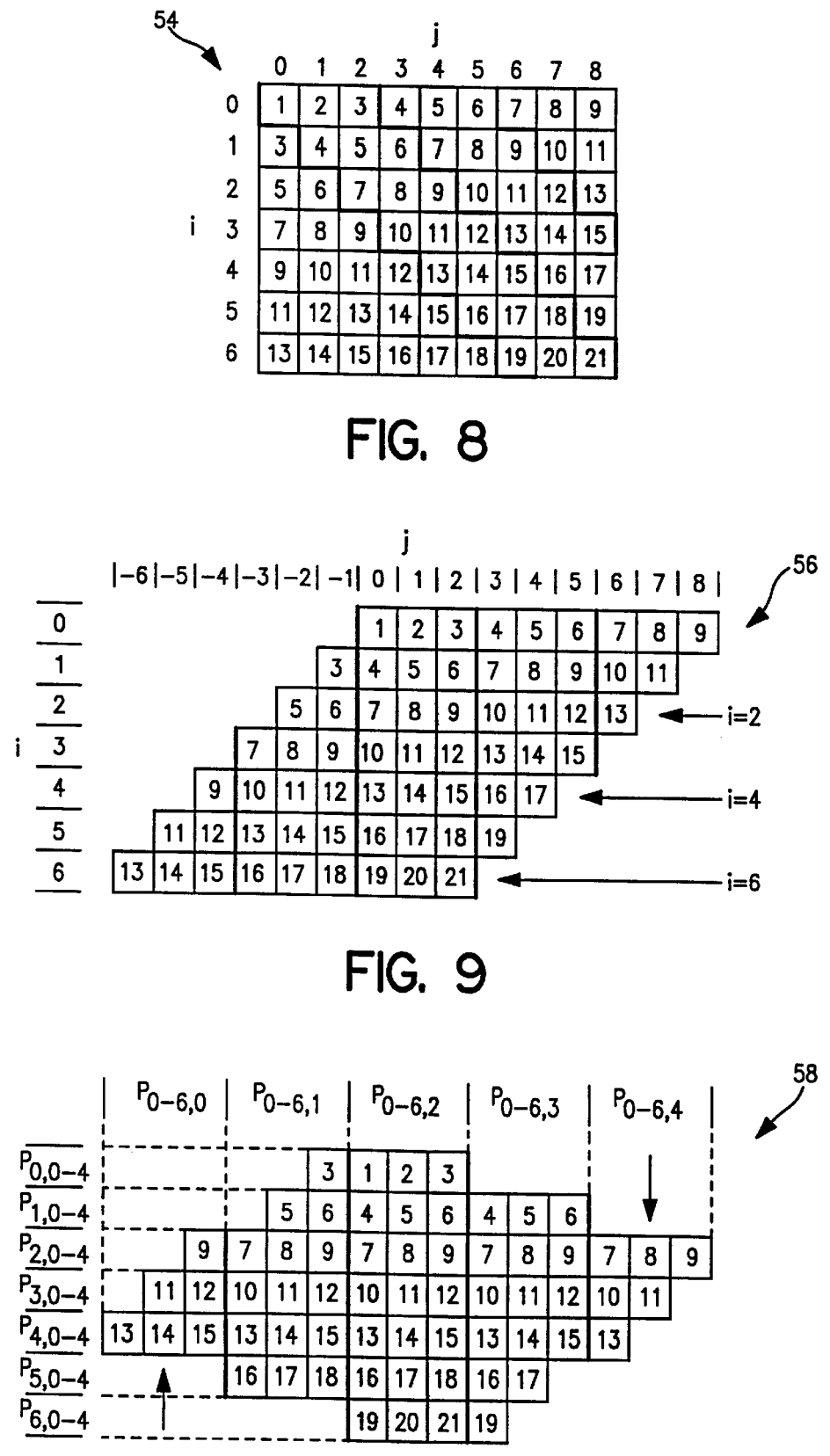

Each of the numerals in the pixels of the image matrix 54 of FIG. 8, as well as the modified image matrices 56 and 58 of FIGS. 9 and 10, represent the timing relative one another that the pixels are processed similar to the embodiment shown in FIG. 4. To preprocess the image matrix 54 shown in FIG. 8, each row i of the matrix is shifted i positions to the left, aligning pixel areas that are processed by the same processor, as shown in the matrix 56 FIG. 9. The data is then shifted by column as follows. For all columns j, for q=−2, −1, 0, 1 and 2, shift the pixels for which $qd \leq j<(q+1)d$, q rows. For example, the pixels in columns 0–2 do not move since for d=3 and j=0 through 2, q=0. For j=3 through 5, q=1; for j=6 though 8, q=2; for j=−1 through −3, q=−1; and for j=−4 through −6, q=−2.

Once shifted, the matrix 58 as shown in FIG. 10 may be handled by a 7 row by 5 column processor array as follows. Each processor will handle up to three pixels in a row. Specifically, processor $P_{0,2}$ will process the pixels that had been located at locations i=0, j=0 through 2, or (0,0), (0,1) and (0,2). Processor $P_{1,2}$ will process the pixels that had been located at (1,1), (1,2), and (1,3) in the matrix 54 of FIG. 8. Processor $P_{2,1}$ will process the pixels that had been located at (3,0), (3,1) and (3,2). Some processors will process only one or two pixels, such as processor $P_{3,4}$ which will process the pixels that had been located at (1,7) and (1,8). Processors $P_{0,0}$, $P_{0,3}$, $P_{0,4}$, $P_{1,0}$, $P_{1,4}$, $P_{5,0}$, $P_{5,4}$, $P_{6,0}$, $P_{6,1}$, and $P_{6,4}$ will not process any pixels.

Figure 11:
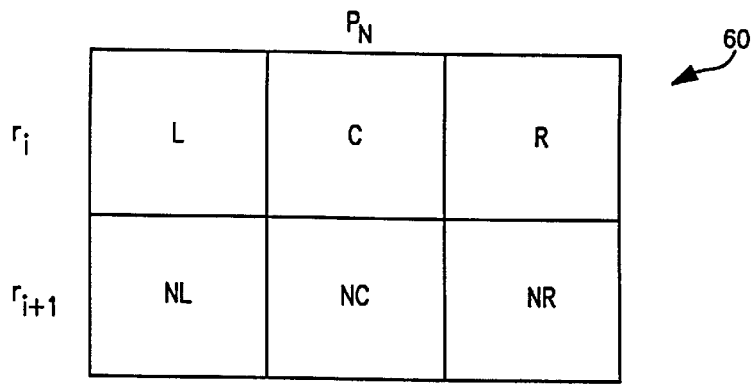
FIG. 11 is a diagrammatic representation of six pixels being stored in a processor.

The benefit of processing the image by an array of processors in this fashion, is that each processor communicates with its nearest neighbors. Each processor has an identification number and maintains six local variables corresponding to two consecutive rows of three consecutive pixels each, e.g., the pixels to be processed (L, C and R) in rows r and the pixels below L, C and R in row r+1, specifically NL, NC, and NR as shown in the representative six pixel memory unit 60 in FIG. 11.

Figure 12:
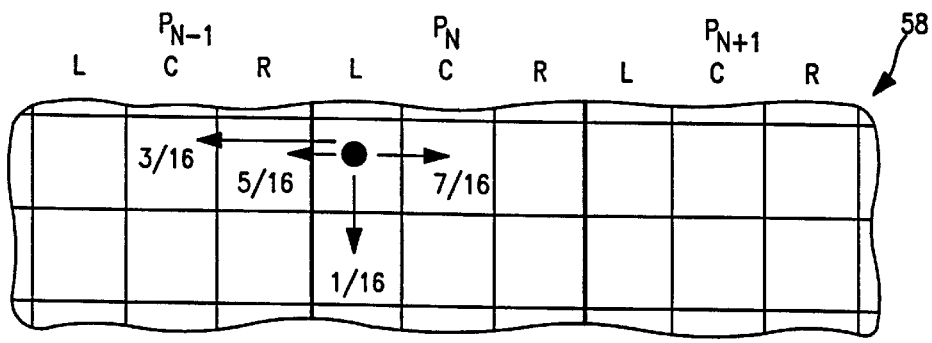
FIGS. 12–14 are diagrammatic representations of the process for dithering the input matrix shown in FIG. 8 after being modified as shown in FIGS. 9 and 10 in accordance with one embodiment of the invention.
Figure 13:
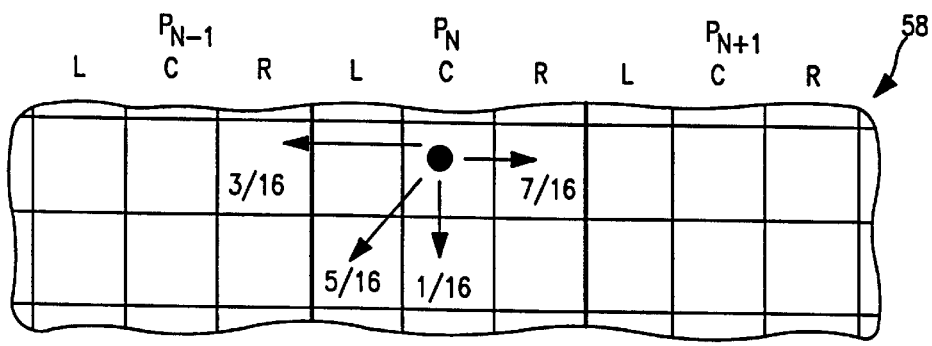
Figure 14:
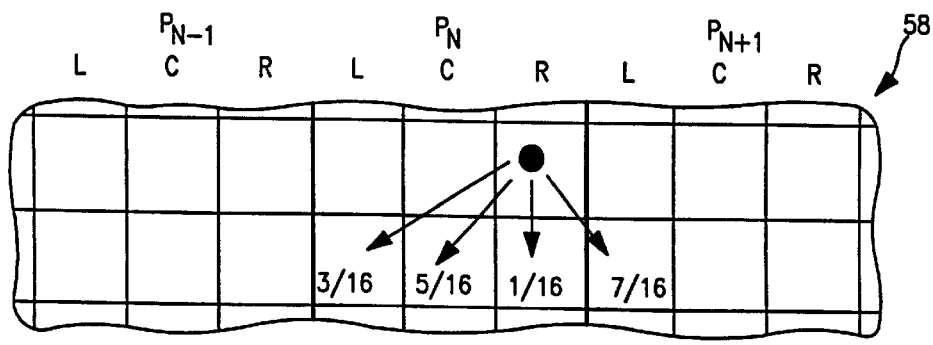

The Floyd and Steinberg neighbor distribution scheme may be applied to a representative portion of the modified matrix 58 as shown in FIGS. 12–14. The modified matrix 58 requires that the errors from the leftmost (L), center (C), and rightmost (R) pixels in a set of three be propagated as shown in FIGS. 12–14. The following steps implement the above process observing the modified error propagation.

The method processes and distributes the error of the left, center, and right variables to the appropriate places as indicated in FIGS. 12–14, and then updates these variables in preparation of processing the next row.

A further advantage of systems of the invention (with both linear processors and arrays of processors), is that they may be easily scaled up or down by adding onto or removing processors from an interconnecting bus. Moreover, one can remove and replace defective processors from the system at minimal cost. Finally, the structure permits fault tolerance features to be programmed into the system by providing the ability to identify and ignore faulty processors.

Those skilled in the art will appreciate that modifications and variations may be made to the above disclosed embodiments without departing from the spirit and scope of the invention.

What is claimed is:

1. A system for processing an image matrix, said system comprising:

partition means for partitioning the input matrix into separate input areas, each input area being defined at least in part by an edge that descends through the input matrix along a diagonal; and a plurality of processors, each processor being in communication with at least one input area, each said processor for processing one of the input areas of the image matrix, and for producing output data.

2. A system as claimed in claim 1, wherein each said diagonal defining an edge of each said input area, descends through said input matrix along a diagonal defined by alternate advances of rows and columns.

3. A system as claimed in claim 1, wherein each said input area is further defined by a row width of at least three picture elements.

4. A system as claimed in claim 1, wherein said plurality of processors includes a linear array of processors.

5. A system as claimed in claim 1, wherein said plurality of processors includes a matrix of processors.

6. A system as claimed in claim 1, wherein said system further includes preprocessing means for adjusting the input matrix prior to processing by said partitioning means and said plurality of processors.

7. A method of processing an image matrix, said method comprising the steps of:

partitioning the input matrix into a plurality of input areas, each input area being defined at least in part by an edge that descends through the input matrix along a diagonal; and processing said input areas by a plurality of processors, each processor being in communication with at least one input area.

8. A method as claimed in claim 7, wherein each said diagonal defining an edge of each said input area, descends through the input matrix along a diagonal defined by alternate advances of rows and columns.

9. A method as claimed in claim 7, wherein each said input area is further defined by a row width of at least three picture elements.

10. A method as claimed in claim 7, wherein said plurality of processors includes a linear array of processors.

11. A method as claimed in claim 7, wherein said plurality of processors includes a matrix of processors.

12. A method as claimed in claim 7, wherein said method further comprises the step of preprocessing the input matrix prior to processing by said plurality of processors.

13. A system for error diffusion dithering comprising:

input means for receiving input data representative of at least a portion of an image matrix; and a plurality of processors in communication with said input means for processing the input data and for producing output data representative of dithered input data, each of said processors for processing at least a portion of the image matrix and at least one processor for processing a portion of the image matrix defined at least in part by a substantially diagonal edge within the image matrix.

14. A system as claimed in claim 13, wherein said substantially diagonal edge defining at least in part a portion of said input matrix, extends generally from the upper left to the lower right of the input matrix.

15. A system as claimed in claim 13, wherein each of said processors processes a different portion of the input matrix defined at least in part by said substantially diagonal edge within the input matrix.

16. A system as claimed in claim 13, wherein said plurality of processors comprises a linear array of processors.

17. A system as claimed in claim 13, wherein said plurality of processors comprises a matrix of processors.

18. A system as claimed in claim 13, wherein said substantially diagonal edge is defined by alternately incrementing along one row then one column at a time as the substantially diagonal edge extends through the input matrix.

19. A system as claimed in claim 13, wherein said portion of the input matrix defined at least in part by said substantially diagonal edge, is further defined by a row width of at least three picture elements.

20. A system as claimed in claim 13, wherein the input matrix is processed by said plurality of processors beginning generally about the upper left corner of the input matrix and extending toward the lower right corner of the input matrix, said processors defining an elongated movement front that extends in a direction that is substantially orthogonal to said substantially diagonal edge.

21. A system as claimed in claim 13, wherein said system further includes a display monitor for displaying an output image responsive to said output data.

22. A system as claimed in claim 13, wherein said system further includes a printer for printing an output image responsive to said output data.

23. A system for error diffusion dithering comprising:

input means for receiving input data in the form of a matrix having n rows and m columns that is representative of at least a portion of an image matrix; and a plurality of processors in communication with said input means for processing the input data and for producing output data representative of dithered input data, at least one of said processors for processing d picture elements in a row of the input matrix data wherein d<m.

24. A system as claimed in claim 23, wherein 2<d<m.

25. A system as claimed in claim 23, wherein said system includes k processors, wherein k=⌈(n−1)/d⌉.

26. A system as claimed in claim 23, wherein said at least one processor processes h contiguous picture elements in a column, wherein 1<h<n.

27. A system for error diffusion dithering comprising:

input means for receiving input data in the form of a matrix having n rows and m columns that is representative of at least a portion of an image matrix; and a plurality of processors in communication with said input means for processing the input data and for producing output data representative of dithered input data, each of said processors for processing a contiguous area of the input matrix that includes at least one row of d picture elements and at least one column of h picture elements, wherein 2<d<m, and wherein 1<h<n.

28. A system as claimed in claim 27, wherein said system includes k processors, wherein k=⌈(n−1)/d⌉.

29. A system as claimed in claim 27, wherein said system further includes a preprocessor means for preprocessing the input matrix in the event that n<m.

* * * * *